(12) United States Patent
Owechko

(10) Patent No.: US 8,131,074 B2
(45) Date of Patent: Mar. 6, 2012

(54) SPECIFIC EMITTER IDENTIFICATION USING HISTOGRAM OF ORIENTED GRADIENT FEATURES

(75) Inventor: Yuri Owechko, Newbury Park, CA (US)

(73) Assignee: Raytheon Company, Waltham, MA (US)

(*) Notice: Subject to any disclaimer, the term of this patent is extended or adjusted under 35 U.S.C. 154(b) by 793 days.

(21) Appl. No.: 12/209,035

(22) Filed: Sep. 11, 2008

(65) Prior Publication Data

US 2010/0061630 A1    Mar. 11, 2010

(51) Int. Cl.
G06K 9/00        (2006.01)
G06K 9/66        (2006.01)
G06K 9/68        (2006.01)

(52) U.S. Cl. .......................... 382/170; 382/190

(58) Field of Classification Search .................. 382/168, 382/170, 190, 218–220; 342/13, 175, 190, 342/192, 387, 444, 451; 345/589, 592, 606; 702/196; 455/9, 115.1
See application file for complete search history.

(56) References Cited

U.S. PATENT DOCUMENTS

| | | | |
|---|---|---|---|
| 7,002,509 B2 * | 2/2006 | Karlsson | 342/90 |
| 7,629,981 B1 * | 12/2009 | West | 345/592 |
| 7,830,297 B1 * | 11/2010 | Wang et al. | 342/13 |
| 2006/0284755 A1 * | 12/2006 | Sirois | 342/13 |
| 2007/0075900 A1 * | 4/2007 | Johnson | 342/387 |
| 2008/0117106 A1 * | 5/2008 | Sarno et al. | 342/444 |
| 2010/0061630 A1 * | 3/2010 | Owechko | 382/170 |

OTHER PUBLICATIONS

N. Dalal and B. Triggs, "*Histograms of Oriented Gradients for Human Detection*," Proceedings of CVPR 2005, 8 pages, http://citeseerx.ist.psu.edu/viewdoc/summary?doi=10.1.1.101.8745.

* cited by examiner

*Primary Examiner* — Amir Alavi

(74) *Attorney, Agent, or Firm* — Christie, Parker & Hale, LLP

(57) ABSTRACT

In one embodiment, a method for specific emitter identification includes receiving a signal from an emitter indicative of a hardware characteristic of the emitter. A computer-readable representation of the received signal is generated. A plurality of gradients for each partition of a plurality of partitions of the computer-readable representation is computed. Each gradient is indicative of at least the angular orientation of a respective portion of the computer-readable representation. A histogram is computed for each partition by assigning each computed gradient to a bin based at least in part on the magnitude of the computed gradient. One or more Histogram of Oriented Gradient (HOG) features are extracted from a concatenation of the bins of all of the computed histograms. The one or more HOG features are compared to one or more corresponding HOG features stored on a computer-readable medium. Based at least in part on the comparison, a determination is made regarding whether the emitter has a particular identification.

20 Claims, 3 Drawing Sheets

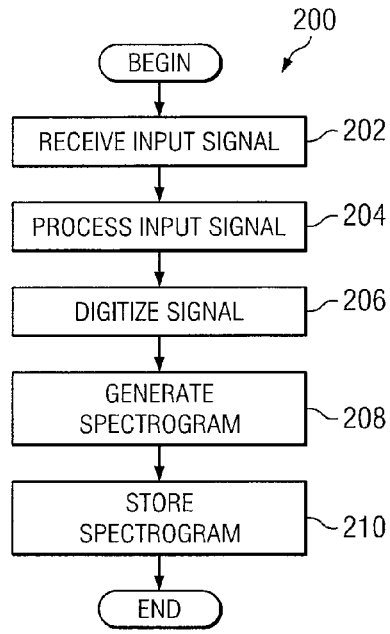
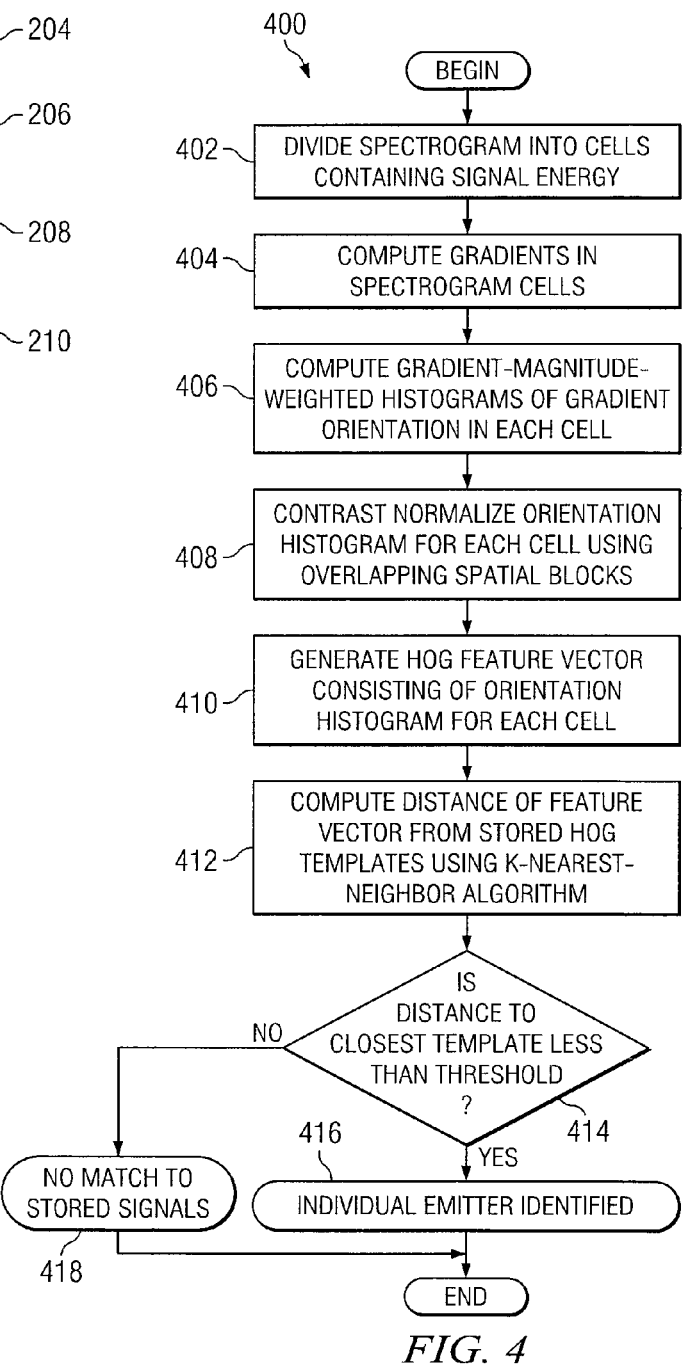

SPECIFIC EMITTER IDENTIFICATION USING HISTOGRAM OF ORIENTED GRADIENT FEATURES

TECHNICAL FIELD

This disclosure relates in general to specific emitter identification, and more particularly to a specific emitter identification using histogram of oriented gradient features.

BACKGROUND

Histogram of Oriented Gradient descriptors, or HOG descriptors, are feature descriptors used in computer vision and image processing for the purpose of object detection. Algorithms associated with HOG descriptors have been used to identify or otherwise distinguish particular features of a static image or video from the background. For example, HOG descriptors have been used to identify a particular vehicle in a satellite image. Additionally, HOG descriptors have been used to distinguish a human profile from the background of a photograph.

Specific emitter identification (SEI) typically involves accurately measuring and storing signal features that are consistent from one transmission to another for a given emitter, but differ from emitter to emitter. A particular emitter may then be identified by attempting to match measured emissions with previously stored emissions. Convention SEI matching methods are limited for a variety of reasons.

SUMMARY

In one embodiment, a method for specific emitter identification includes receiving a signal from an emitter indicative of a hardware characteristic of the emitter. A computer-readable representation of the received signal is generated. A plurality of gradients for each partition of a plurality of partitions of the computer-readable representation is computed. Each gradient is indicative of at least the angular orientation of a respective portion of the computer-readable representation. A histogram is computed for each partition by assigning each computed gradient to a bin based at least in part on the magnitude of the computed gradient. One or more Histogram of Oriented Gradient (HOG) features are extracted from a concatenation of the bins of all of the computed histograms. The one or more HOG features are compared to one or more corresponding HOG features stored on a computer-readable medium. Based at least in part on the comparison, a determination is made regarding whether the emitter has a particular identification.

Technical advantages of certain embodiments of the present disclosure include simple, fast, and robust methods for specific radio frequency emitter identification. Various embodiments may identify or "fingerprint" individual transmitters based solely on their hardware characteristics in a manner that is completely independent of a transmitted message. Some methods may reliably identify particular emitters that produce slightly inconsistent emission patterns. Some such methods can reliably identify such transmitters with only a single recorded emission. In some embodiments, more difficult transmitters with variable signatures can be reliably fingerprinted by recording several turn-on transients using Histograms of Oriented Gradient (HOG) features.

Other technical advantages of the present disclosure will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present disclosure and its advantages, reference is now made to the following description, taken in conjunction with the accompanying drawings, in which:

FIG. 2 is a flowchart illustrating an example method for generating a computer-readable representation of an electromagnetic emission that may be used by the system of FIG. 1 according to one embodiment;

FIG. 4 is a flowchart illustrating an example method for specific emitter identification that may be used by the system of FIG. 1 according to one embodiment.

DETAILED DESCRIPTION

Particular embodiments of the present disclosure may be used in the context of fingerprinting and identifying individual radio frequency (RF) transmitters based on their time-frequency turn-on characteristics. In some embodiments, a spectrogram of the turn-on transient is analyzed using Histograms of Oriented Gradient (HOG) features. The degree of similarity between a stored template HOG features and the HOG features calculated from the transient spectrogram of an emitter may be used to identify the individual emitter. The example embodiments of the present disclosure are best understood by referring to FIGS. 1 through 3 of the drawings, like numerals being used for like and corresponding parts of the various drawings.

Figure 1:
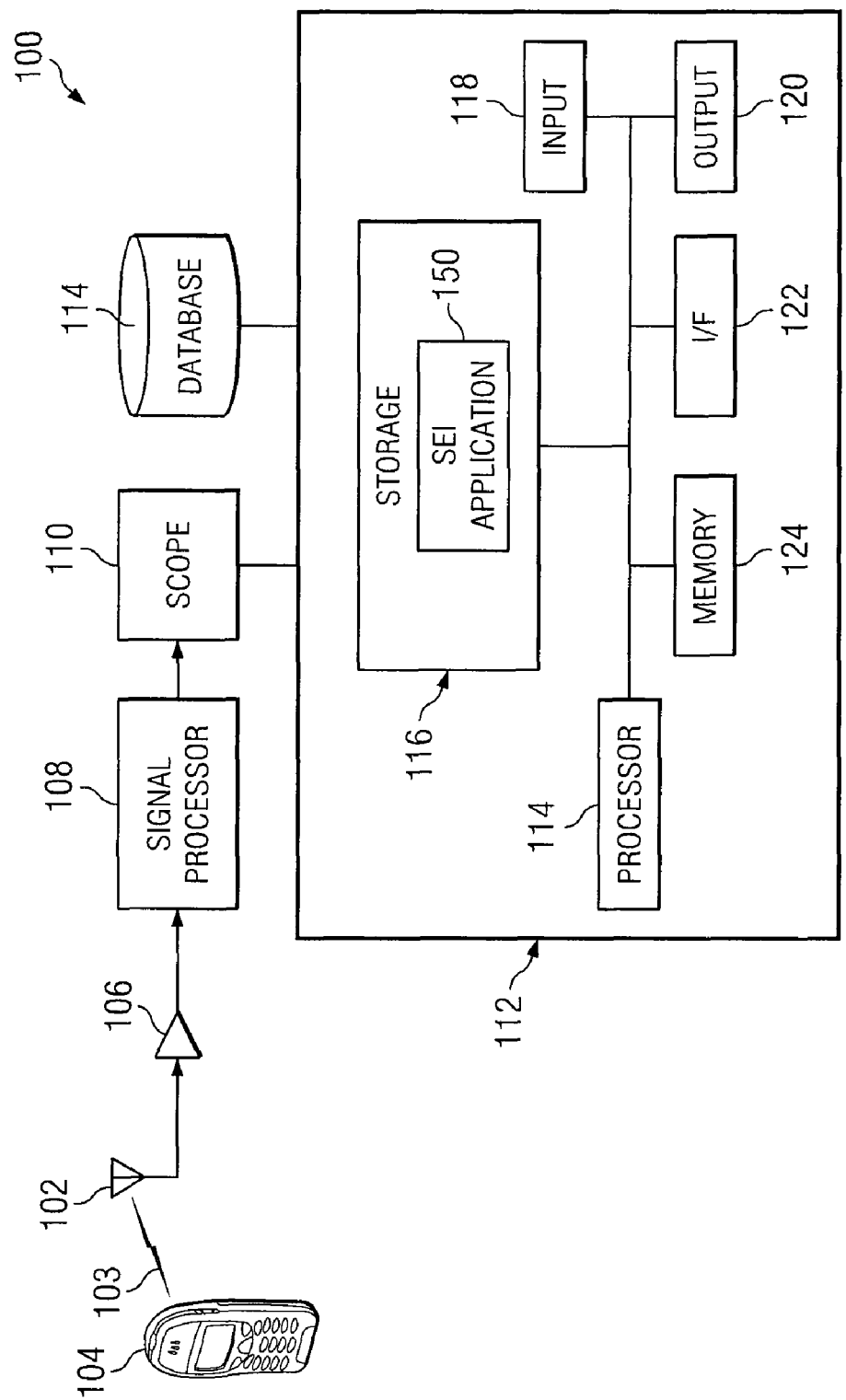
FIG. 1 is a portion of an emitter identification system according to one embodiment.

FIG. 1 is a block diagram of a portion of an emitter identification system 100 according to one embodiment. In this example, system 100 generally includes a receiver 102 capable of receiving a signal 103 from an emitter 104, an amplifier 106, a signal processor 108, a scope 110, a client 112, and a database 111. In general, scope 110 generates a computer-readable representation of an amplified and modulated input signal received from emitter 104. A Specific Emitter Identification (SEI) application 116 residing in storage 118 of client 112 may use the computer-readable representation to identify or "fingerprint" individual emitters 104, as explained further below.

Emitter 104 generally refers to any device capable of emitting an electromagnetic signal 103. For example, emitter 104 may be a radio transmitter, a garage door opener, a key fob, a transponder, a cellular phone, a cordless phone, a computer (e.g., a handheld computer, a laptop computer, a desktop computer etc.), or any other device capable of emitting an electromagnetic signal. In this example, emitter 104 is a cellular telephone capable of generating radio frequency signals 103 that may be received by receiver 102. Receiver 102 generally refers to any device capable of receiving an electromagnetic signal 103 from emitter 104. In this example, receiver 102 is a radio frequency (RF) receiver that communicates the received signal 103 to amplifier 106.

Amplifier 106 generally converts a received input signal 103 (e.g., one with a very small amount of energy, which may be a few milliwatts in one example) into a different output signal (e.g., one with a larger amount of energy than the input signal). In this example, amplifier 106 amplifies the signal received from receiver 102 and communicates the amplified signal to signal processor 108; however, some alternative embodiments may not include signal processor 108. Signal processor 108 generally refers to any component(s) capable of processing an input signal to produce an output signal that may be used by scope 110. For example, signal processor 108 may include one or more mixers, signal generators, electronic filters, analog-to-digital (A/D) converters, any combination of the preceding, or some other device capable of processing an input signal to produce an output that may be used by scope 110.

Scope 110 generally refers to any suitable device(s) capable of generating a computer-readable representation of an input signal (e.g., the digitization of respective input signals used to generate the spectrograms 300, 310, 320, and 330 illustrated in FIGS. 2A through 2D). In this example, scope 110 includes an analog-to-digital (A/D) converter that may sample an analog input, received from signal processor 108, at speeds up to 500 MS/s (i.e. a new sample may be taken every two nanoseconds); however, scope 110 may use alternative configurations (e.g., slower or faster sampling rates of an input signal) to generate a computer-readable representation from any of a variety of input signals (e.g., a digital input signal digitized by signal processor 108). According to one embodiment of the present disclosure, scope 110 may be a CompuScope 8500 of Gage Applied Technologies. In this example, scope 110 communicates the computer-readable representation of the input signal to client 112 and/or database 111.

Database 111 generally stores data, and facilitates addition, modification, and retrieval of such data. In various embodiments, database 111 may be used to conveniently consolidate all computer-readable representations generated by scope 111 and/or processed by client 112. In this example, database 111 resides separate from scope 110 and client 112. For example, database 111 may be stored on a separate dedicated server. In other embodiments, however, database 111 may alternatively reside, for example, within scope 110 or client 112.

Client 112 generally refers to any suitable device(s), applications, other logic, or a combination of any of the preceding capable of using a computer-readable representation of an input signal to identify/fingerprint the particular emitter 104 associated with the input signal. For example, client 112 may include a personal digital assistant, a computer (e.g., a laptop, a desktop, a server, or any other suitable computer), a cellular telephone, a mobile handset, or any other device capable of using a computer-readable representation of an input signal to identify/fingerprint the particular emitter 104 associated with the input signal. Logic as used herein generally performs the operations of a particular component, such as executing instructions to generate output from input. Logic may include hardware, software, other logic, or a combination of any of the preceding. In some embodiments, logic associated with client 112 may manage the operation of a component of system 100. In this example, client 112 includes a processor 114, a storage device 116, an input device 118, an output device 120, communication interface 122, and a memory device 124. The components 114-124 of client 112 may be coupled to each other in any suitable manner. In the illustrated embodiment, the components 114-124 of client 112 are coupled to each other by a bus.

Processor 114 generally refers to any suitable device capable of executing instructions and manipulating data to perform operations for client 112. For example, processor 114 may include any type of central processing unit (CPU). Input device 118 may refer to any suitable device capable of inputting, selecting, and/or manipulating various data and information. For example, input device 118 may include a keyboard, mouse, graphics tablet, joystick, light pen, microphone, scanner, or other suitable input device. Memory device 124 may refer to any suitable device capable of storing and facilitating retrieval of data. For example, memory device 124 may include random access memory (RAM), read only memory (ROM), a magnetic disk, a disk drive, a compact disk (CD) drive, a digital video disk (DVD) drive, removable media storage, or any other suitable data storage medium, including combinations thereof.

Communication interface 122 may refer to any suitable device capable of receiving input for client 112, sending output from client 112, performing suitable processing of the input or output or both, communicating to other devices, or any combination of the preceding. For example, communication interface 122 may include appropriate hardware (e.g., modem, network interface card, etc.) and software, including protocol conversion and data processing capabilities, to communicate through a LAN, WAN, or other communication system that allows client 112 to communicate to other devices. Communication interface 122 may include one or more ports, conversion software, or both. Output device 120 may refer to any suitable device capable of displaying information to a user. For example, output device 120 may include a video/graphical display, a printer, a plotter, or other suitable output device.

Storage device 116 may refer to any suitable device capable of storing computer-readable data and instructions. Storage device 116 may include, for example, logic in the form of software applications, computer memory (e.g., Random Access Memory (RAM) or Read Only Memory (ROM)), mass storage media (e.g., a magnetic drive, a disk drive, or optical disk), removable storage media (e.g., a Compact Disk (CD), a Digital Video Disk (DVD), or flash memory), a database and/or network storage (e.g., a server), other computer-readable medium, or a combination and/or multiples of any of the preceding. In this example, an SEI application 150 embodied as logic within storage 112 generally manages acts used to identify/fingerprint the computer-readable signal representations generated by scope 110; however, SEI application 150 may alternatively reside within any of a variety of other suitable computer-readable medium, including, for example, memory device 124, database 111, removable storage media (e.g., a Compact Disk (CD), a Digital Video Disk (DVD), or flash memory), any combination of the preceding, or some other computer-readable medium.

The components 102, 104, 106, 108, 110, 112, and 114 of system 100 may be integrated or separated. Although FIG. 1 provides one example of computer-readable storage 112 as operating separate from scope 110, in other embodiments storage 112 may operate within scope 110. In some embodiments, components 102, 106, 108, 110 and 114 may each be housed within a single chassis. As used in this document, "each" refers to each member of a set or each member of a subset of a set. The operations of system 100 may be performed by more, fewer, or other components. For example, the operations of amplifier 106 and signal processor 108 may be performed by one component, or the operations of scope 110 may be performed by more than one component. Additionally, operations of system 100 may be performed using any suitable logic that may comprise software, hardware, other logic, or any suitable combination of the preceding. The general operation of system 100 and example acts that may be managed and/or executed by SEI application 150 are described further below with reference to FIGS. 2 through 4.

FIG. 2 is a flowchart 300 illustrating an example method for generating a computer-readable representation of an electromagnetic emission 103 that may be used by system 100 according to one embodiment. In this example, system 100 generally generates one or more two-dimensional representations (e.g., spectrograms) of emission 103 in the time-frequency domain based on the turn-on characteristics of corresponding emitters 104; however, any suitable computer-readable representation may be used. For example, some alternative representations may include, but are not limited to, Wigner and Gabor-Wigner distributions corresponding to emission 103.

In this example, receiver 102 receives a uniquely identifiable electromagnetic signal 103 from emitter 104 in act 202. For example, receiver 102 may capture a turn-on transient emitted by emitter 104. Turn-on transients typically contain signal features unique to the actual hardware of a corresponding emitter 104 (i.e. independent of any information encoded in the transmission) and thus may provide a uniquely identifiable fingerprint for each emitter 104. That is, the turn-on transient signal features are typically consistent from one transmission to another for a given emitter 104, but differ from emitter to emitter. In some embodiments, even emitters 104 of the same make and model may each produce a uniquely identifiable turn-on transient.

The received signal 103 is processed in act 204. Such processing may or may not include converting the received electromagnetic signal 103 into electrical form, amplifying the signal by amplifier 106, mixing the signal with another signal generated by a signal generator (not explicitly shown), electrically filtering the signal, converting the electrical signal (e.g., analog-to-digital conversion) any combination of the preceding, or any of a variety of other signal processing acts. In various embodiments, the signal processing of act 204 may be effected by signal processor 108. In this example, however, scope 110 performs at least some of the signal processing by executing an analog-to-digital conversion of the signal in act 206. A computer-readable representation of the digitized signal is generated in act 208. In this example, scope 110 generates data, in act 208, which may be used to construct a two-dimensional spectrogram of the turn-on transient in the time-frequency domain. In act 210, the spectrogram data is stored, for example, in storage 116, memory 124, database 111, any combination of the proceeding, or some other suitable computer-readable medium. SEI application 150 may use the stored spectrogram data to extract HOG features for specific emitter identification. The degree of similarity between a template of stored HOG features and the HOG features extracted from the turn-on transient spectrogram of emitter 104 may then be used to identify the particular emitter 104.

FIGS. 3A through 3D illustrate example spectrograms 300, 310, 320, and 330, respectively, which may be generated and/or used by system 100 for specific emitter identification (SEI) according to one embodiment. Each spectrogram 300, 310, 320, and 330 captures one or more unique characteristics of a respective emitter 104, thereby providing an identifiable fingerprint for the emitter 104. In this example, emitters 104 are identified by capturing respective turn-on transients in the time-frequency domain; however, any suitable analysis of any identifiable signal may be used. The spectrogram of the turn-on transient of an RF emitter 104 may be represented as $$S(t, f) = \left| \int_{-\infty}^{\infty} h^*(u - t)s(u)e^{-j2\pi fu} du \right|^2 \qquad \text{Equation 1}$$

where s(t) is the signal and h(t) is a window function. Equation 1 may be used to obtain the time-frequency distribution of the turn-on transient of any given emitter 104.

Figure 3A:
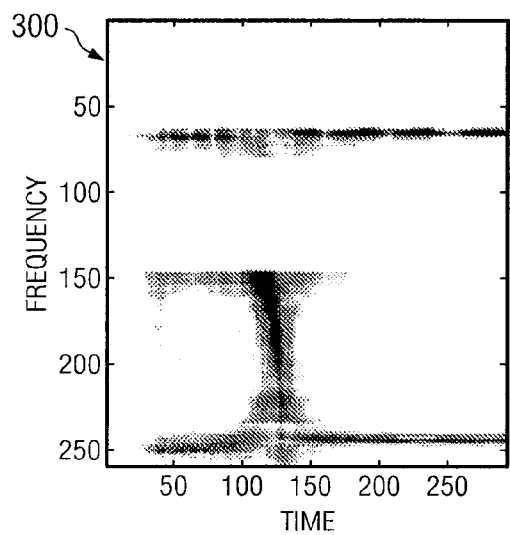
FIGS. 3A through 3D illustrate respective example graphical representations that may be generated and/or used by the system of FIG. 1 for specific emitter identification according to one embodiment.
Figure 3B:
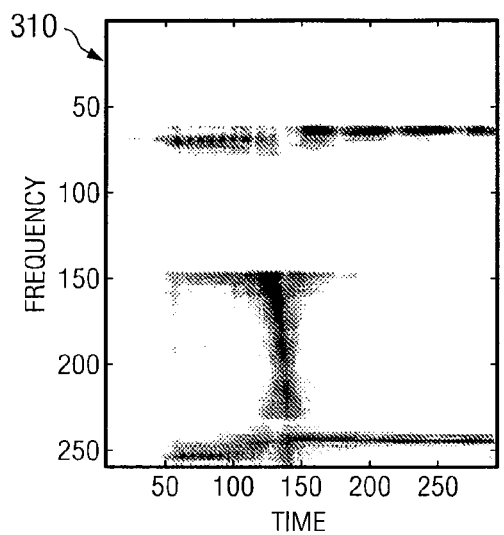
Figure 3C:
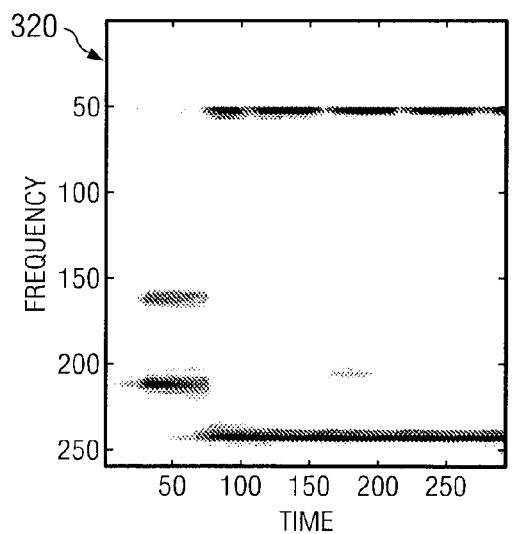
Figure 3D:
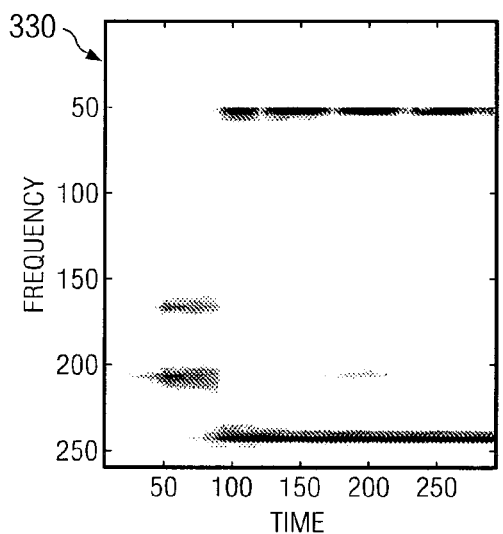

In this example, FIGS. 3A and 3B illustrate first and second actual recordings of the turn-on transient for a first emitter 104; and FIGS. 3C and 3D illustrate first and second actual recordings of the turn on transient for a second emitter 104 of the same make and model. Repeated recordings of the turn-on emissions showed that some variation may exist even for the same transmitter. Therefore, a brittle matching method such as two-dimensional correlation may not be robust enough for some applications. Accordingly, some embodiments of the present disclosure recognize a method for specific emitter identification based at least in part on the HOG features of a spectrogram. An example method for specific emitter identification using HOG features of a spectrogram are described further with reference to FIG. 4.

FIG. 4 is a flowchart 400 illustrating an example method for specific emitter identification that may be used by system 100 according to one embodiment. In general, the HOG features of an emission's spectrogram may be used to extract identifying information of the emission's source. That is, the HOG features are determined from a graphical representation of signal patterns emitted by a particular emitter 104. This example uses the time-frequency distributions of spectrograms captured from the turn-on transient of emitter 104 (e.g., spectrograms 300, 310, 320 and 330 illustrated in FIGS. 3A through 3D, respectively); however, any suitable computer-readable representation that captures any suitable signal component may be used (e.g., computer-readable representations that capture signal components that include amplitude, phase, three or more dimensions, etc.).

In act 402, a computer-readable representation of an input signal is separated into partitions. For example, data that may be displayed as a two-dimensional representation of the input signal may be analytically divided into a grid of cells. In some embodiments, it may not be necessary to analyze the features of every cell. For example, it may be advantageous to select for processing only those cells with significant signal energy in order to reduce computational complexity and improve accuracy. Act 402 may thus additionally involve selecting the particular cells to process.

In act 404, a gradient operator is used on at least a subset of the cells (e.g., the cells selected in act 402) in order to estimate the angular orientation and gradient strength of edges in the cell. According to one embodiment, the gradient operator involves convolution with a Sobel kernel. In act 406, a weighted orientation histogram is calculated. For example, the contribution of each time-frequency data point may be assigned to a histogram orientation bin by the strength or magnitude of the gradient at that location.

In act 408, the histogram of each cell may then be normalized using, for example, the sum of all histogram bins in a block of cells centered on the cell being processed. If the cells are equal-sized squares, rectangles or diamonds, for example, a particular cell may be normalized using the sum of eight neighboring cells that share a common "side" with the particular cell. Thus, in some embodiments, the same cell or block of cells may be used more than once during the normalization of act 408. In other words, the neighboring cells used to normalize one particular cell may overlap with the neighboring cells used to normalize another particular cell. In this manner, act 408 may help to make the features more robust against contrast variations.

A resulting HOG feature vector is determined in act 410 by concatenating all of the histogram bins for all of the applicable cells (e.g., the cells selected in act 402). Act 412 involves computing the distance between the determined HOG feature vectors and the stored feature vectors of previously recorded emissions (e.g., feature vectors that may be stored within database 111, storage 112, or some other suitable computer-readable medium). For example, the K-Nearest-Neighbor (KNN) algorithm can be used to compensate for variability between signals by comparing the input signal to multiple examples of stored signal signatures.

A decision is made in act 414 regarding whether the computed difference between the closest recorded features and the determined HOG feature vectors is less than a predetermined threshold. If the distance is less than the threshold, a match to the stored signal data is found and the identity of a particular emitter is confirmed in act 416. If the difference is greater than the predetermined threshold, then the conclusion in act 418 is that no match exists. Flowchart 400 ends after completing either act 416 or 418.

Thus, various embodiments provide a simple, fast, and robust method for specific emitter identification. Various embodiments may identify or fingerprint individual transmitters based solely on their hardware characteristics in a manner that is completely independent of a transmitted message. Such hardware characteristics provide an electronic fingerprint that is difficult, if not impossible, to imitate or counterfeit. For example, the turn-on transient of an emitter may significantly differ even between the same models of a particular device made by the same manufacture using precisely the same components.

Additional example applications of the present disclosure include security applications in wireless networks where intruders or legitimate users could be identified based on physical hardware characteristics, home security features (e.g., garage door openers), toll road or parking garage transponder systems, and so forth. In addition, the disclosure of the present invention may be used in surveillance applications. For example, the recordings over time of various emissions in a particular area may later be used to identify a particular emission source. Such a feature may be useful, for example, to identify a particular device used to trigger an explosion.

Various methods may reliably identify particular emitters that produce slightly inconsistent emission patterns. Some such methods can reliably identify some transmitters with only a single recorded turn-on transient. In some embodiments, more difficult transmitters with variable signatures can be reliably fingerprinted by recording several Histograms of Oriented Gradient (HOG) features.

In some instances, the hardware characteristics of a particular emitter 104 may change over time. For example, the turn-on transient of a cordless phone may change over the life of the cordless phone. Some embodiments may include signal maintenance modules that update stored signal features with information corresponding to these physical changes over time. For example, some embodiments may require a user to update, after the lapse of a predetermined amount of time, the HOG features of a particular emitter 104 stored within database 111.

Although the present disclosure has been described with several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

What is claimed is:

1. A method for specific emitter identification, comprising: using a processor in performing the steps of:
   generating a computer-readable representation of a signal received from an emitter, the received signal being indicative of a hardware characteristic of the emitter;
   computing a plurality of gradients for each partition of a plurality of partitions of the computer-readable representation, each gradient indicative of at least the angular orientation of a respective portion of the computer-readable representation;
   for each partition, computing a histogram by assigning each computed gradient to a bin based at least in part on the magnitude of the computed gradient;
   extracting one or more Histogram of Oriented Gradient (HOG) features from a concatenation of the bins of all of the computed histograms;
   comparing the one or more HOG features to one or more corresponding HOG features stored on a computer-readable medium; and
   determining, based at least in part on the comparison, whether the emitter has a particular identification.

2. The method of claim 1, wherein the received signal comprises the turn-on transient of the emitter.

3. The method of claim 1, wherein the generated computer-readable representation of the signal is displayable as a two-dimensional representation of the signal in the time-frequency domain.

4. The method of claim 1, wherein computing the plurality of gradients further comprises using a convolution operator comprising a Sobel kernel.

5. The method of claim 1, wherein the comparing comprises using a K-Nearest-Neighbor (KNN) algorithm.

6. The method of claim 1, further comprising selecting each partition of the plurality of partitions from a set of partitions of the computer-readable representation, the selection of each partition based at least in part on an energy level of the signal represented by the partition.

7. The method of claim 1, further comprising normalizing each computed histogram of each partition of the plurality of partitions using the computed histogram of at least one other partition of the plurality of partitions.

8. A specific emitter identification system, comprising:
   a receiver operable to receive a signal from an emitter indicative of a hardware characteristic of the emitter;
   a signal processor communicatively coupled to the receiver and operable to process the signal received from the emitter;
   a scope communicatively coupled to the signal processor and operable to generate a computer-readable representation of the signal processed by the signal processor;
   logic encoded in computer-readable medium and operable when executed to:
     compute a plurality of gradients for each partition of a plurality of partitions of the computer-readable representation, each gradient indicative of at least the angular orientation of a respective portion of the computer-readable representation;
     compute a histogram for each partition by assigning each computed gradient to a bin based at least in part on the magnitude of the computed gradient;

extract one or more Histogram of Oriented Gradient (HOG) features from a concatenation of the bins of all of the computed histograms;

compare the one or more HOG features to one or more corresponding HOG features stored on a computer-readable medium; and determine, based at least in part on the comparison, whether the emitter has a particular identification.

9. The system of claim 8, wherein the received signal comprises the turn-on transient of the emitter.

10. The system of claim 8, wherein the generated computer-readable representation of the signal is displayable as a two-dimensional spectrogram of the signal in the time-frequency domain.

11. The system of claim 8, wherein the logic is further operable to compute the plurality of gradients using a convolution operator comprising a Sobel kernel.

12. The system of claim 8, wherein the comparing comprises using a K-Nearest-Neighbor (KNN) algorithm.

13. The system of claim 8, wherein the logic is further operable to select each partition of the plurality of partitions from a set of partitions of the computer-readable representation, the selection of each partition based at least in part on an energy level of the signal represented by the partition.

14. The system of claim 8, wherein the logic is further operable to normalize each computed histogram of each partition of the plurality of partitions using the computed histogram of at least one other partition of the plurality of partitions.

15. A method for specific emitter identification, comprising:

using a processor in performing the steps of:

generating a computer-readable representation of a signal indicative of a hardware characteristic of an emitter;

extracting a plurality of Histograms of Oriented Gradient (HOG) features of the computer-readable representation;

comparing the one or more HOG features to one or more corresponding HOG features stored on a computer-readable medium; and determining, based at least in part on the comparison, whether the emitter has a particular identification.

16. The method of claim 15, wherein the signal comprises the turn-on transient of the emitter.

17. The method of claim 15, wherein the generated computer-readable representation of the signal is displayable as a two-dimensional spectrogram of the signal in the time-frequency domain.

18. The method of claim 15, further comprising updating one or more of the HOG features stored on the computer-readable medium based at least in part on the extracted plurality of HOG features.

19. The method of claim 15, wherein the comparing comprises using a K-Nearest-Neighbor (KNN) algorithm.

20. The method of claim 15, wherein the extracting the plurality of HOG features of the computer-readable representation further comprises extracting the plurality of HOG features using only a subset, but not all, of the computer-readable representation.

\* \* \* \* \*